3,067,206
Patented Dec. 4, 1962

3,067,206
NEW SECONDARY AND TERTIARY
INDOLYLETHYLAMINES
Teunis Kralt and Hendrik Durk Moed, Weesp, Netherlands, assignors to North American Philips Company, Inc., New York, N.Y., a corporation of Delaware
No Drawing. Filed July 8, 1960, Ser. No. 41,471
Claims priority, application Netherlands July 13, 1959
11 Claims. (Cl. 260—319)

This invention relates to new and novel indolylethylamines related to tryptamine.

More particularly this invention relates to new and novel derivatives of tryptamine corresponding to the general formula:

(I)

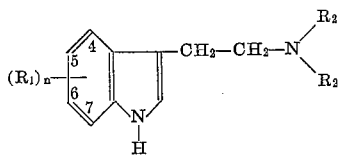

wherein $R_1$ represents a hydroxy or an etherified hydroxy group, $n$ is an integer having the value 0, 1, 2 or 3, $R_2$ is an aliphatic hydrocarbon group with at least 3 carbon atoms, in which at least one hydrogen atom is replaced by a hydroxy, an etherified or an esterified OH group and $R_3$ is a hydrogen atom or a lower alkyl group, in which one or more hydrogen atoms may be replaced by hydroxy, etherified hydroxy or an esterified OH group, on the understanding that the alkyl groups contain at most 8 carbon atoms, and their non-toxic addition salts.

The novel compounds of the invention have useful pharmacological properties in that they exhibit spasmolytic activities and effect the central nervous system. The novel compounds have a reserpin-like central action, without side effects shown by reserpin, and are very useful in the treatment of mammals, for example to quiet mammals that are in a state of nervous excitement or anxiety.

The novel compounds of the invention also are useful as dye intermediates and as bases in the perfume industry.

In the compounds of the invention when $n$ is not 0 and $R_1$ an etherified hydroxy group in the benzene ring of the indole skeleton, $R_1$ is for example a lower alkoxy group with 1–6 carbon atoms, for example a methoxy-, ethoxy or propyloxy group. Suitable compounds, are, for example, those for which $n$ has the value 0, or those compounds for which $n=1$ or 2 and $R_1$ is an etherified hydroxy group, respectively hydroxy groups in the 5 and/or 6 positions of the indole skeleton. Particularly those compounds turned out to be of importance for which $R_1$ represents a hydrogen atom or a methoxy group in the 5 position of the indole skeleton.

$R_2$ is for example one of the groups

—$CH_2$—$CH_2$—$CH_2$—$OR_4$,
—$CH_2$—$CH_2$—$CH_2$—$CH_2$—$OR_4$,
—$CH_2$—$CH_2$—$CH_2$—$CH_2$—$CH_2$—$OR_4$,
—$CH_2$—$CH_2$—$CH$—$CH_2OR_4$,
—$CH_2$—$CH_2$—$CHOR_4$—$CH_2$—$CH_3$ or

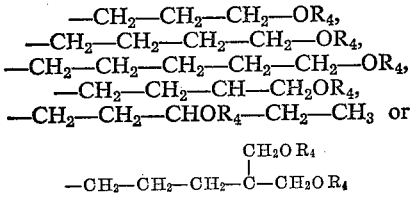

in which groups $R_4$ represents a hydrogen atom, an acyl, an alkyl or an aralkyl group.

$R_3$ may also be one of the groups mentioned for $R_2$ or a $C_2H_4OR_4$ group, but also a hydrogen atom or a lower alkyl group, for example a methyl, ethyl, propyl, isopropyl, butyl, isobutyl, amyl, isoamyl group or a heptyl group or a hexyl group, straight or branched chained.

For example, those compounds, in which $R_2$ is a —$(CH_2)_4$—$OR_4$ group and $R_3$ is a $C_2H_5$ group, turned out to have a particularly great central activity.

In these groups $R_4$ represents a hydrogen atom, a lower alkyl group, an aralkyl group or an acyl group.

Lower alkyl groups represented by $R_4$ may be alkyl groups with 1–8 carbon atoms, for example, a methyl, ethyl, propyl, butyl, isobutyl, amyl or heptyl group. As aralkyl groups represented by $R_4$ may be for example, a benzyl group or a phenethyl group.

The compounds according to the invention, in which $R_4$ is an acyl group, are, for example, esters of aliphatic carboxylic acids, for example of acetic acid, propionic acid, butyric acid, isovaleric acid, stearic acid, aliphatic dicarboxylic acids, for example oxalic acid, succinic acid, glutaric acid, adipinic acid, unsaturated aliphatic carboxylic acids, for example acrylic acid, crotonic acid, citraconic acid, of aliphatic hydroxy acids, for example glycolic acid, tartaric acid, citric acid, of cyclic aliphatic carboxilic acids, for example cyclopentanic carboylic acid, cyclohexaneacetic acid, of aromatic carboxylic acids, for example benzoic acid, o-, m- or p-methyl-benzoic acid, phthalic acid, o-, m- or p-hydroxy benzoic acid, 3,4,5-trimethoxybenzoic acid or of mixed aromatic-aliphatic carboxylic acids, for example phenyl acetic acid, phenyl propionic acid or of 4,5-dimethoxyphenylpropionic acid.

Of particular importance are those compounds for which $R_4$ is a hydrogen atom and those in which the OH group is esterified with a lower aliphatic carboxylic acid, for example acetic acid, propionic acid or butyric acid, or with a benzoic acid substituted if desired by one or more OH groups which may be etherified, for example p-hydroxybenzoic acid or 3,4,5-trimethoxybenzoic acid.

As salts of the compounds according to the invention are preferably to be considered the non-toxic acid addition compounds, for example the hydrochloric, the acetic, the phosphoric and, benzoic acid salts.

The spasmolytic activity of the compounds was determined in vitro according to a method described by Magnus in Pflugers Archiv., 120, 123 (1904).

According to this method, the contraction of an intestine is measured under the influence of a solution of a spasmogen. After establishing what concentration of papaverine is required to reduce 50% of this contraction for 50%, it is determined what concentration of the compound to be investigated is likewise capable of reducing 50% of the contraction caused by the spasmogen.

When carbaminoylcholine (Doryl) was used as a spasmogen, the spasmolytic activity of neurotropic nature of the compounds according to the invention, turned out to be comparable with or larger than that of papaverine.

When the spasmolitic activity of musculotropic nature, was measured with $BaCl_2$ used as a spasmogen, it was found that compounds according to the invention also in this respect showed a stronger activity than papaverine. For example, for 3-[2'-{4''-(3''',4''',5''8-trimethoxybenzoyloxy)-N-ethyl butyl-amino}ethyl] indole a 2 to 5 times as large activity and for the 3,4,5-trimethoxy benzoic acid ester of 5-methoxy-3-[2'-(N-ethyl-4''-hydroxy-butylamino)ethyl] indole a 5 to 10 times as large activity as that of paparevine with respect to $BaCl_2$ was found.

The central activity of compounds according to the invention was found by recording the electroencephalogram (E.E.G.) in rabbits according to a method described by Monnier and Laue in Helvel. Physiol. Acta 11, 73 (1953).

According to this method a rabbit having a body weight of 1.5–2 kg. was injected in the scalp with a 2% novocaine solution. The scalp was laid open and a Plexiglas plate, in which a net of holes had been bored, was screwed to the scalp in a manner such that each hole corresponded to a part of the cortex of the cerebrum.

For recording the E.E.G., silver electrodes were used which were screwed into the scalp through the holes in the Plexiglas plate. Bipolar records were made of the area praecentralis, parietalis and striata. The recording was effected by means of a directly writing 8-channel electroencephalograph. In each experiment, first the rest E.E.G. and then the E.E.G. after the intravenous administration of the substances to be tested was investigated. In addition, during each experiment the cortical reaction to various stresses was investigated.

The E.E.G. is modified to a large extent by electric stresses, and by certain drugs. A so-called "arousal reaction" for example may be produced by high frequency electric stresses. Such an "arousal reaction" is also obtained after the administration of for example adrenalin, amphetamine or physostigmine. On the other hand there exist substances which are capable of inhibiting the "arousal reaction" produced by electric stresses or by certain substances, for example atropine, largactil and morphine.

In general, substances that produce an "arousal reaction" have a central stimulating effect, while those that inhibit the "arousal reaction" have a central sedative effect.

It was found, for example, that 3-{2'-(N-ethyl 4''-hydroxybutylamino)ethyl}-5-methoxy indole showed an inhibition of the "arousal reaction," caused either by electric stresses of by administration of physiostigmine. This sedative activity was confirmed by checking the behaviour of cats, dogs and monkeys prior to and after the injection with these substances.

The dog, for example, showed a highly prolonged very strong decrease of the irritability after intravenous injection of the substance. For example, it turned out to be impossible to attract the animal's attention by sounds, pain stresses or offering sausage, not even one hour after the intravenous administration of 1 mg. of this substance per kg. of body weight.

Other compounds according to the invention appeared capable of producing an "arousal reaction" in the E.E.G. Thus 3-{2'-(N-ethyl 4''-acetoxybutylamino)ethyl} indole and 3-[2'{N-ethyl 4''-(3''', 4''', 5'''-trimethoxy) benzoyloxy butylamino}ethyl]-5-methoxy indole are remarkable in the particularly low dosage with which a very strong reaction in the E.E.G. can be produced, namely ⅕–⅒ of the dosage of amphetamine which has to be used to cause an equally strong reaction.

The compounds of the invention may be prepared for example by converting primary or secondary amines or their salts into secondary or tertiary amines.

Thus, an indolylethylamine is used as starting material, although it is also possible to start from an other suitable primary or secondary substituted alkylamines and alkylating this for example with an indolylethylhalide.

Among the methods commonly used for the alkylation of an amine which may be used for the preparation of the compounds according to the invention there may be mentioned for example those in which a possible substituted alkyl halide, those in which a possible substituted acid chloride or acid anhydride of an aliphatic carboxylic acid and those in which a possible substituted aliphatic ketone or aldehyde are used as the alkylating agent. Only in the first case are secondary or tertiary amines obtained directly, in the two other cases the primary formed amides, or Schiff's bases have to be converted into amines by reduction. These so-called reductive alkylations may be carried out, if desired, without purification and isolation of the intermediates formed amides or Schiff's bases.

As substituents in these alkylating agents are to be considered hydroxy, possibly etherified hydroxy or esterified hydroxy groups, or such groups which can be converted, after the alkylation reaction, into hydroxy etherified or esterified hydroxy groups, for example double bonded oxygen atoms, carboxyl groups or esterified carboxyl groups which can be converted, by reduction, into OH groups and —CH$_2$OH groups respectively, or halogen atoms which are replaced by an OH group, an ether group or an ester group respectively, for example by reaction with moist silver oxide, a metal alcoholate or a metal salt of an organic carboxylic acid.

The reaction of a tryptamine with an alkyl halide is preferably carried out in a solvent, for example a lower aliphatic alcohol, for example methanol or ethanol, or in benzene or toluene, if desired in the presence of a substance capable of binding the released acid halide, for example an organic base, for example pyridine, triethylamine or an excess of the amines to be alkylated at a temperature between 0° C. and the boiling temperature of the mixture.

By choice of the ratios of the quantities of the reaction components and of the reaction conditions, one or two groups in the tryptamine can be substituted at the nitrogen atom outside the ring. With a secondary tryptamine, another second substituent may also be introduced at the amino nitrogen atom outside the ring. Because of the extremely slight reactivity of the hydrogen atom at the nitrogen atom in the ring of the indole skeleton, no substitution at this nitrogen atom will take place under normal reaction condition.

Substituents in the alkylhalide may be converted, if desired, into hydroxy, etherified or esterified hydroxy groups after the alkylation reaction.

For example, keto or aldehyde groups may be reduced by dissolving the alkylamine or a salt thereof for example in water or in a lower aliphatic alcohol, for example methanol or ethanol and hydrogenating with hydrogen in the presence of a catalyst, for example a platinum or palladium catalyst or with Raney nickel. This reduction may be carried out in an autoclave at room temperature and at atmospheric pressure or at elevated temperatures and enhanced pressures. This reduction may also be carried out by means of a metal hydride, for example LiAlH$_4$ or NaBH$_4$ or of a metal alkylhydride, for example a dialkylaluminiumhydride, in an inert solvent, for example in an ether, for example diethyl ether, dioxane or tetrahydrofurane. After completion of the reaction the resultant metal addition compound is decomposed by the addition of for example water or an alcohol, for example methanol or ethanol. This decomposition reaction is preferably carried out at low temperature, for example by cooling with ice.

After washing and drying the organic liquid, the amino alcohol may be obtained in a pure form for example by crystallization of a salt thereof or by vacuum distillation.

If the alkyl halide used for the alkylation of the tryptamine contains possibly esterified carboxyl groups, these groups are reduced to a CH$_2$OH group after the alkylation reaction, preferably by means of a metal hydride or a metal alkyl hydride in the same manner as described above for the reaction of a keto group or an aldehyde group.

If for the introduction of an alkyl group in a primary or a secondary tryptamine the acid anhydride or an acid halide of a substituted or unsubstituted aliphatic carboxylic acid is used, the reaction may be carried out in the presence of a solvent. Very good results are also obtained by adding an excess of an acid anhydride liquid at the reaction temperature and forming the amide at a temperature between room temperature and the boiling temperature of the mixture. When using an acid halide, the reaction is preferably carried out in a solvent, for example in benzene, in the presence of an organic base, for example a pyridine or triethylamine.

After completion of the reaction, the amide may be isolated for example by evaporating the excess of acid anhydride in vacuo and likewise distilling the residue in vacuo.

The reduction of the acid amide to the corresponding amine may for example be carried out by means of a metal hydride, for example LiAlH₄, NaH₄ or LiBH₄, or a metal alkyl hydride, for example a dialkylaluminum hydride or a dialkylborium hydride, in a solvent that does not form any irreversible reaction product with the reduction agent, for example diethylether, tetrahydrofurane or dioxane. Preferably, an equivalent quantity or a small excess of the reduction agent, for example a 10–20% excess, is used, although also a larger excess does not disturb the course of the reaction.

Keto groups, aldehyde groups or possibly carboxyl groups, or esterified carboxylic groups are simultaneously reduced to OH groups respectively —CH₂OH— groups. This should consequently be taken into account when choosing the quantity of reduction agent.

After decomposing the metal addition compound, for example with water or alcohol, and washing and drying the organic liquid, the amine may be isolated, for example by crystallization of a salt thereof or by vacuum distillation.

In this alkylation method, one unsubstituted or substituted alkyl group is invariably introduced. For example, an alkyl group is introduced in a non-substituted acid anhydride or acid chloride of an aliphatic carboxylic acid is used. If a primary or a secondary tryptamine is caused to react with a semi ester-semi acid halide or with the acid anhydride of an aliphatic dicarboxylic acid, an amino alcohol is obtained after the reduction of the semi-ester-semiacid amide and of the semiacid-semiamide respectively.

The reductive alkylation of the tryptamine with a ketone or an aldehyde is preferably carried out in an alcoholic solvent, for example in ethanol, under hydrogen in the presence of a catalyst, for example Raney nickel, platinum or palladium.

The alkylation of the tryptamine with a ketone or an aldehyde may also be carried out according to the method of Leuckart, in which formic acid, ammonium formiate or formamide is added to the mixture of the aldehyde or the ketone and the primary or seconary amine, if desired in a solvent. In this reaction, a formyl compound is primarily formed. The formyl group bound to the nitrogen atom may be split off by boiling with dilute acid, for example hydrochloric acid or sulphuric acid or with alkali, for example 30% sodium hydroxide solution. The splitting off with acid as a rule gives better results than the splitting off with a sodium hydroxide solution. Very good results are obtained by adding to the mixture of ketone or aldehyde and amine 80% formic acid. For example, 4 times the equimolar quantity of formic acid, but also a far larger excess, for example 16 times the equimolar quantity calculated on the ketone or the aldehyde may be used. This reaction is preferably carried out at a temperature between 150° C. and 200° C.

In these alkylating agents, halogen atoms may be present in the alkyl groups as substituents which, after the alkylation reaction according to known methods, may be converted into hydroxy etherified or esterified hydroxy groups. For example, a halogen alkylamine may be reacted with a metal salt, for example the Na or K-salt of an organic carboxylic acid, replacing the halogen atom by an esterified OH group.

In the case of a substituted alkylating agent, it will often depend on the reaction condition which of the substituents will react with the hydrogen atom of the amino group outside the ring of the tryptamine For example, in the case of a halogen-substituted ketone the halogen atom will be caused to react with the hydrogen atom of the amine by choosing the reaction conditions, by heating for example a solution of the halogen ketone and the tryptamine, for example in alcohol or benzene, in the presence of an acid-binding agent. If a catalyst, such as Raney nickel, platinum or palladium is added to the solution of the amine or the salt thereof and the halogen ketone in alcohol, and one hydrogenates in the presence of hydrogen, a halogen alkylamine is obtained.

The etherification or esterification of the OH groups possibly present in the alkylation products or reaction products thereof, may be carried out according to commonly used methods.

The esterification may be carried out, for example, by causing an alkali metal compound of the alcohol to react with an alkyl halide or aralkyl halide, for example in a solvent, such as benzene or toluene.

The esterification may be carried out for example by causing the alcohol to react with a halide or the anhydride of the organic carboxylic acid.

It should be noted that the above-described methods serve only as examples of the manners in which the compounds according to the invention can be prepared. The number of methods or combinations thereof are not at all restricted to those given in this specification.

For example, first a short alkyl group may be introduced, in which for example a keto group is substituted, and this alkyl group afterwards by reaction with a Grignard compound into a substituted alkyl group with more carbon atoms. Also a methyl group or an ethyl group may be introduced for example as a substituent at the nitrogen atom by reaction with dimethyl sulphate or diethyl-sulphate.

According to another mode of preparing compounds according to the invention, the tryptamine is alkylated with a hydrocarbon group containing one or more double bonds, in which afterwards a compound according to Formula I is obtained by addition to this double bond.

EXAMPLE I

*(a) 3-(2'-acetamido-ethyl) indole*

A mixture of 15 g. (0.094 mol) of 3-(2'-amino-ethyl) indole and 75 ml. of acetic acid anhydride was heated to 75° C. and left to stand at room temperature for 15 minutes. The excess of acetic acid anhydride was evaporated in vacuo, after which the residue was distilled in vacuo.

The yield amounted to 12.5 g. (76%). Boiling point 195–196° C. 0.01 mm. Melting point 81–82° C.

By reaction of 3-(2'-amino-ethyl) indole with the anhydrides of propionic acid, butyric acid, isobutyric acid, valeric acid, and isovaleric acid, the following compounds are prepared in the same manner:

3-(2'-propionylamido-ethyl) indole
3-(2'-butyroylamido-ethyl) indole
3-(2'-isobutyroylamido-ethyl) indole
3-(2'-valeroylamido-ethyl) indole, and
3-(2'-isovaleroylamido-ethyl) indole

*(b) 3-(2'-ethylamido-ethyl) indole*

A solution of 18 g. (0.089 mol) of 3-(2'-acetamido-ethyl) indole in 100 ml. of dry tetrahydrofurane was added, within 15 minutes, to a solution of 6 g. (0.758 mol) of lithium aluminum hydride in 600 ml. of dry tetrahydrofurane. The mixture was then boiled for 14 hours. The reaction complex was decomposed with 20 ml. of water while cooling with ice. The resulting precipitate was sucked off and washed with diethyl ether. The filtrate was dried with sodium sulphate, filtered and the diethyl ether and tetrahydrofurane were evaporated. The residue was distilled in vacuo. The yield amounted to 12 g. (72%). Boiling point 151–156° C./0.06 mm.

By reducing in the same manner 3-(2'-propionylamido-ethyl) indole, 3-(2'-butyroylamido-ethyli) indole, 3-(2'-isobutyroylamido-ethyl) indole, 3-(2'-valeroylamido-ethyl) indole and 3-(2'-isovaleroylamide-ethyl) indole the following compounds are prepared 3-(2'-propylamino-ethyl) indole, 3-(2'-butylamino-ethyl) indole, 3-(2'-isobutylamino-ethyl) indole, 3-(2'-amylamino-ethyl) indole and 3-(2'-iso-amylamino-ethyl) indole.

(c) 3-{2'-(N-3''-carbethoxypropionyl ethylamino)ethyl} indole

To a solution of 12 g. (0.064 mol) of 3-(2'-ethylaminoethyl) indole and 5 g. of pyridine in 100 ml. of dry benzene, a solution was added, while stirring and within 15 minutes, of 10.5 g. (0.064 mol) of 3-carbethoxypropionylchloride in 40 ml. of dry benzene. After being allowed to stand overnight at room temperature, the precipitated pyridine hydrochloride was sucked off, washed with benzene and the benzene was evaporated from the filtrate. The yield amounted to 100%. The non-distilled product was used for the reaction to be described below.

(d) 3-{2'-(N-ethyl-4''-hydroxybutylamino)ethyl} indole

A solution of 20 g. (0.064 mol) of non-distilled 3-{2'-(N-3''-carbethoxypropionylethylamino)ethyl} indole in 200 ml. of dry tetrahydrofurane was added in 15 minutes to a solution of 7 g. (0.185 mol) of lithium aluminum hydride in 400 ml. of dry tetrahydrofurane. Then the mixture was boiled for 18 hours. The reaction complex was decomposed with 20 ml. of water while cooling with ice. The resulting precipitate was sucked off and washed with tetrahydrofurane. The filtrate was dried with sodium sulphate, filtered and the tetrahydrofurane evaporated. The residue was distilled in vacuo. The yield amounted to 7.5 g. (47%). Boiling point 195–205° C./0.05 mm.

In the same manner as described sub (c) and (d), reactions of 3-(2'-propylamino-ethyl) indole, 3-(2'-butylamino-ethyl) indole, 3-(2'-isobutylamino-ethyl) indole, 3-(2'-amylamino-ethyl) indole and 3-(2'-iso-amylaminoethyl) indole with 3-carbethoxypropionyl-chloride and subsequent reduction of the resultant tertiary aminoalcohols result in:

3-{2'-(N-propyl-4''-hydroxybutylamino)ethyl} indole
3-{2'-(N-butyl-4''-hydroxybutylamino)ethyl} indole
3-{2'-(N-isobutyl-4''-hydroxybutylamino)ethyl} indole
3-{2''-(N-amyl-4''-hydroxybutylamino)ethyl} indole, and
3-{2'-(N-isoamyl-4''-hydroxybutylamino)ethyl} indole

EXAMPLE II

(a) 3-{2'-(3''-carbethoxypropionylamino)ethyl} indole

The preparation was carried out in a manner analogous to the method described in Example Ic. Instead of pyridine, triethylamine was used as hydrochloric acid binding agent. The yield amounted to 100%. Melting point 88–90° C.

(b) 3-{2'-(4''-Hydroxybutylamino)Ethyl} Indole

The preparation was carried out in a manner analogous to the method described in Example Id, by reducing non-distilled 3-{2'-(3''-carbethoxypropionylamino)ethyl} indole with a solution of lithium aluminum hydride in dry tetrahydrofurane. The yield amounted to 18%. Boiling point 205–211° C./0.15 mm. Equivalent weight 233 (calculated 232).

EXAMPLE III

(a) 3-{2'-(2''-Carbethoxyethylamino)Ethyl} Indole

A mixture of 16 g. (0.1 mol) of 3-(2'-aminoethyl) indole and 9.05 g. (0.05 mol) of 3-bromopropionic acid ethylester (prepared according to R. Lukes and J. Kovar, Chem. Listy 49, 775–7 (1955), in 100 ml. of absolute ethanol was refluxed for 3 hours. The ethanol was evaporated in vacuo and the residue was dissolved in a mixture of 75 ml. of dry tetrahydrofurane and 25 ml. of dry diethylether. After some time, the precipitated 3-(2'-aminoethyl) indole hydrobromide was sucked off and washed twice with 30 ml. of dry tetrahydrofurane. The ether and the tetrahydrofurane were evaporated to form the filtrate. The yield amounted to 100%. Equivalent weight 275 (calculated 260).

The non-distilled product was used for the reaction to be described below.

(b) 3-{2'-(3''-Hydroxypropylamino)Ethyl} Indole

A solution of 13 g. (0.05 mol) of non-distilled 3-{2'-(2''-carbethoxyethylamino)ethyl} indole in 50 ml. of dry tetrahydrofurane was added, in 10 minutes and while stirring, to a solution of 2.2 g. (0.058 mol) of lithium aluminum hydride in 75 ml. of dry tetrahydrofurane. Then the mixture was boiled for another thirty minutes while stirring. The reaction complex was decomposed with 8 ml. of water while cooling with ice. The resulting precipitate was sucked off and washed twice with 30 ml. of tetrahydrofurane. The filtrate was dried with sodium sulphate, filtered and the tetrahydrofurane was evaporated. The residue (9.8 g.) was distilled in vacuo. The yield amounted to 5.6 g. (51%). Boiling point 192–5° C./0.05 mm. Equivalent weight 218 (calculated 218).

The 3-{2'-(1''-methyl 3''-hydroxypropylamino)ethyl} indole can be prepared in the same manner by reaction of tryptamine with beta-bromo butyric acid ethyl ester and subsequent reduction. Also the following tertiary amines are prepared in the same manner by reaction of the secondary amines prepared according to Examples Ia and b with 3-bromopropionic acid ethyl ester:

3-{2'-(N-ethyl 3''-hydroxypropylamino)ethyl} indole
3-{2'-(N-propyl 3''-hydroxypropylamino)ethyl} indole
3-{2'-(N-butyl 3''-hydroxypropylamino)ethyl} indole
3-{2''-(N-isobutyl 3''-hydroxypropylamino)ethyl} indole
3-{2'-(N-amyl 3''-hydroxypropylamino)ethyl} indole
3-{2'-(N-isoamyl 3''-hydroxypropylamino)ethyl} indole

EXAMPLE IV

(a) 3-{2'-(N-3''-Carbethoxypropionyl-2'''-Carbethoxyethylamino)Ethyl} Indole The preparation was carried out in a manner analogous to the method described in Example Ic. Instead of pyridine, triethylamine was used as hydrochloric acid binding agent. The yield amounted to 100%. The non-distilled product was used for the reaction to be described below.

(b) 3-{2'-(N-3''-Hydroxypropyl-4'''-Hydroxybutylamino)Ethyl} Indole

A solution of 13.5 g. (0.039 mol) of non-distilled 3-{2' - (N - 3'' - carbethoxypropylionyl - 2''' - carbethoxyethylamino)ethyl} indole in 75 ml. of dry tetrahydrofurane was added, while stirring and in 15 minutes, to a solution of 5 g. (0.132 mol) of lithium-aluminum hydride in 175 ml. of dry tetrahydrofurane. Then the mixture was boiled for 17 hours. The reaction complex was decomposed with 15 ml. of water while cooling with ice. The resulting precipitate was sucked off and washed with tetrahydrofurane. The filtrate was dried with sodium sulphate, filtered and the tetrahydrofurane was evaporated. The residue was distilled in vacuo.

The yield amounted to 7.3 g. (65%). Boiling point 232–6° C./0.05 mm. Equivalent weight 293 (calculated 290). In the same manner, the 3-{2'-(N-1''-methyl-3''-hydroxypropyl 4'''-hydroxy-butylamino)ethyl} indole, the 3 - {2' - (N - 1'' - methyl - 3'' - hydroxypropyl 3''' - hydroxypropylamino)ethyl} indole and the 3-{2'-(N-1''-methyl 3''' - hydroxypropyl 5''' - hydroxypentylamino)ethyl} indole are prepared.

In a corresponding manner are also prepared the compounds:

3-[2'-{bis(3''-hydroxypropyl) amino}ethyl] indole
3-[2'-{bis(4''-hydroxybutyl) amino}ethyl] indole, and
3-[2'-{bis(5''-hydroxypentyl) amino}ethyl] indole

EXAMPLE V

(a) 1-Benzyloxy-5-Bromopentane

A mixture of 5.75 g. (0.25 mol) of powdered sodium and 54 g. (0.5 mol) of benzyl alcohol in 50 ml. of dry benzene was left to stand at room temperature for 5 hours. All the sodium had then dissolved. A solution of 230 g. (1 mol) of 1,5-dibromopentane in 250 ml. of dry benzene was added to the reaction mixture. Then the mixture was boiled for 30 hours. After cooling, the precipitated sodium bromide was sucked off and washed with benzene. The benzene was evaporated from the filtrate and the residue distilled in vacuo. The yield amounted to 34.8 g. (54%). Boiling point 105–9/0.15 mm. Bromine content 31.9% (calculated 31.10%).

(b) *3-{2'-(N-3''-Hydroxypropyl-5'''-Benzyl-oxypentylamino)Ethyl} Indole*

A mixture of 7.85 g. (0.036 mol) of 3-{2'-(3'''-hydroxypropylamino)ethyl} indole and 4.63 g. (0.018 mol) of 1-benzyloxy-5-bromopentane in 75 ml. of absolute ethanol was refluxed for 18 hours. The ethanol was evaporated in vacuo. 75 ml. of chloroform and 50 ml. of water were added to the residue and the whole was shaken until everything had dissolved. The layers were separated. The chloroform layer was dried with sodium sulphate, filtered, and the chloroform was evaporated. The residue weighed 7.1 g. (100%). Equivalent weight 412 (calculated 394). The substance was dissolved in 150 ml. of ether, decanted from 700 mg. of insoluble oil and the solution in ether was extracted three times with 30 ml. 1 N hydrochloric acid. The 1 N hydrochloric acid layers, together with the separated oil, were combined, rendered alkaline with 20 ml. of 50% sodium hydroxide and extracted twice with 60 ml. of ether. The ether layers were combined and dried with sodium sulphate, filtered, and the ether was evaporated. The residue weighed 5.3 g. (75%). Equivalent weight 395 (calculated 394). After distillation, the yield amounted to 57%. Boiling point 265–275/0.01 mm. Equivalent weight 392 (calculated 394).

In the same manner are prepared:

3 - {2' - (N - 2'' - hydroxyethyl 5''' - benzyloxypentylamino)ethyl} indole

3 - {2' - (N - 4'' - hydroxybutyl 5''' - benzyloxypentylamino)ethyl} indole, and 3 - {2' - (N - 5'' - hydroxypentyl 5''' - benzyloxypentylamino)ethyl} indole

EXAMPLE VI (a) *3-(2-Acetamido-Ethyl)-5-Methoxy Indole*

12 g. (0.119 mol) of triethylamine were added to a suspension of 18 g. (0.095 mol) of 3-(2'-aminoethyl)-5-methoxy-indole in 500 ml. of dry benzene. Subsequently a solution of 7.5 g. (0.0955 mol) of acetyl-chloride in 150 ml. of dry benzene was added in 30 minutes while stirring. The reaction mixture was boiled for 30 minutes, while stirring. After cooling, the precipitate was sucked off, stirred with 250 ml. of acetone and sucked off again. The acetone and the benzene of the filtrate were evaporated. The yield amount to 25 g. The crude reaction product was used for the reaction to be described below.

(b) *3-(2'-Ethylamino-Ethyl)-5-Methoxy-Indole*

The preparation was carried out in a manner analogous to the method described in Example Ib, by reducing 3-(2'-acetamido-ethyl)-5-methoxy-indole with a solution of lithium aluminum hydride in dry tetrahydrofurane. The yield amounted to 53%. Boiling point 160–166° C./0.1 mm. Melting point 84–88° C.

(c) *3-{2'-(N-3''-Carbethoxypropionylethylamino)-Ethyl}-5-Methoxy-Indole*

The preparation was carried out in a manner analogous to the method described in Example Ic. Instead of pyridine, triethylamine was used as hydrochloric acid binding agent. The yield amount to 100%. The crude reaction product was used for the reaction to be described below.

(d) *3-{2'-4''-Hydroxy-N-Ethylbutylamino)Ethyl}-5-Methoxy-Indole*

The preparation was carried out in a manner analogous to the method described in Example Id by reducing 3-{2'-(N - 3'' - carbethoxypropionylethylamino)ethyl} - 5-methoxy-indole with a solution of lithium aluminum hydride in dry tetrahydrofurane. The yield amounted to 83%. Boiling point 195–212° C./0.04 mm.

By reacting, in the same manner as described sub (a), 3-(2'amino-ethyl)-5-methoxy indole with respectively propionyl chloride, butyryl chloride, isobutyryl chloride, valeryl chloride and isovaleryl chloride, subsequently reducing the resulting amide in the manner as described sub (b), causing the thus obtained alkylamines to react with 3-carbethoxypropionyl chloride in the manner as described sub (c), and reducing the thus obtained compounds in the manner as described sub (d), the following compounds are prepared:

3 - {2' - N - propyl - 4'' - hydroxybutylamino)ethyl} - 5-methoxy-indole

3 - {2' - (N - butyl - 4'' - hydroxy - butylamino)ethyl}-5-methoxy-indole

3 - {2' - (N - isobutyl - 4'' - hydroxy - butylamino)ethyl}-5-methoxy-indole

3 - {2' - (N - amyl - 4'' - hydroxy - butylamino)ethyl}-5-methoxy-indole, and

3 - {2' - (N - isoamyl - 4'' - hydroxy - butylamino)ethyl}-5-methoxy-indole

The secondary amino alcohol 3-{2'-4''-hydroxybutylamino)ethyl}-5-methoxy-indole is prepared in the manner as described sub (c) and (d) by causing 5-methoxy tryptamine to react with 3-carbethoxypropionyl chloride and subsequent reduction.

By causing the resulting compound to react once again with 3-carbethoxypropionyl chloride in the manner described sub (c) and (d), the tertiary amino alcohol with two hydroxy groups 3-{2'-bis(4''-hydroxybutylamino)-ethyl}-5-methoxy-indole is prepared.

EXAMPLE VII

In the same manner as described in the Examples I–V, the following compounds are prepared by alkylation of 5,6-dimethoxy-tryptamine:

3 - {2' - (4'' - hydroxybutylamino)ethyl} - 5,6 -dimethoxy-indole

3 - {2' - (N-ethyl - 4'' - hydroxy - butylamino)ethyl}-5,6-dimethoxy-indole

3 - {2' - (N - propyl - 4'' - hydroxy - butylamino)ethyl}-5,6-dimethoxy-indole

3 - {2' - (N - butyl - 4'' - hydroxy - butylamino)ethyl}-5,6-dimethoxy-indole

3 - {2' - (N - isobutyl - 4'' - hydroxy - butylamino)ethyl}-5,6-dimethoxy-indole 3 - {2' - (N - amyl - 4'' - hydroxy - butylamino)ethyl}-5,6-dimethoxy-indole 3 - {2' - (N - isoamyl - 4'' - hydroxy - butylamino)ethyl}-5,6-dimethoxy-indole 3 - {2' - bis(4'' - hydroxybutylamino)ethyl} - 5,6 - dimethoxy-indole 3 - {2' - (3'' - hydroxypropylamino)ethyl} - 5,6 - dimethoxy-indole 3 - {2' - (N - 3'' - hydroxypropyl - 4''' - hydroxybutylamino)ethyl}-5,6-dimethoxy-indole 3 - {2' - (N 3'' - hydroxypropyl 5''' - hydroxypentylamino)ethyl}-5,6-dimethoxy-indole 3 - {2' - (5'' - hydroxy - N - alkylpentylamino)ethyl}-5,6-dimethoxy-indole, and 3 - {2' - (3'' - hydroxy - N - alkylpropylamino)ethyl}-5,6-dimethoxy-indole

EXAMPLE VIII

In the same manner as described in the Examples I–V, the corresponding benzyloxytryptamines substituted at the hydrogen atom are prepared by alkylation of benzyl-oxytryptamines. By catalytic reduction with hydrogen and Pt as a catalyst, the benzyloxy group is hydrogenated to a hydroxy group.

EXAMPLE IX

The alcohols mentioned in the preceding examples may also be esterified in the commonly used manner.

For example, a mixture of 4 g. (0.0154 mol) of 3-{2'-(4''-hydroxy-N-ethylbutylamino)ethyl} indole and 1.22 g. (0.0155 mol) of acetyl-chloride in 75 ml. of dry benzene was boiled, while stirring, for 90 minutes. The benzene was evaporated in vacuo. The hydrochloride did not crystallize from acetone, methylethyl-ketone, alcohol and mixtures of these solvents with ether. By dissolving the hydrochloride in 75 ml. of water, rendering it alkaline with 2 N sodium hydroxide solution and extracting twice with 25 ml. of ether, the free base was isolated. The yield amounted to 3.4 g. (73%).

*Analysis.*—Found: C, 71.13%, 70.95%; H, 8.49%, 8.46%; N, 9.30%, 9.27%. Calculated: C, 71.25%; H, 8.61%; N, 9.27%.

By esterifying 3-{2'(4''-hydroxy-N-ethylbutylamino)-ethyl} indole in the same manner with 3,4,5-trimethoxybenzoyl chloride, 3[2'-{4''-(3''',4''',5'''-trimethoxybenzyloxy)-N-ethylbutylamino}ethyl] indole was prepared.

Its hydrochloric acid salt crystallized from a mixture of methyl ethyl ketone and ether. The yield amounted to 64%. Melting point 139–146° C. After recrystallization from methyl ethyl ketone, the melting point rises to 140–142° C. Ultraviolet absorption spectrum $\lambda_{max}$=270 m$\mu$ $\epsilon_{max}$=15,600.

*Analysis.*—Found: C, 63.60%; H, 72.0%; OCH$_3$, 18.84%; N, 5.71%. Calculated: C, 63.61%; H, 7.14%; OCH$_3$, 18.96%; N, 5.71%.

Of 3-{2'-(4''-hydroxy-N-ethylbutylamino)ethyl} indole are prepared in a corresponding manner the esters of propionic acid, butyric acid, isovaleric acid, stearic acid, oxalic acid, succinic acid, glutaric acid, adipinic acid, acrylic acid, crotonic acid, oil acid, citraconic acid, glycol acid, tartaric acid, citric acid, cyclopentanecarboxylic acid, cyclohexane acetic acid, benzoic acid, o-, m- and p-methylbenzoic acid, phthalic acid, o-, m- and p-hydroxybenzoic acid, phenylacetic acid, phenylpropionic acid and 4, 5-dimethoxyphenylpropionic acid.

EXAMPLE X

Also other amino alcohols were esterified in the same manner according to the invention.

For example, 3-{2'-(4''-hydroxy-N-ethylbutylamino)-ethyl}-5-methoxy indole was esterified with 3,4,5-trimethoxybenzoyl-chloride in a solution in benzene, to which triethylamine had been added as hydrochloric acid binding agent. After sucking off the precipitated triethyl amino hydrochloride, the benzene was evaporated from the filtrate and the hydrochloride was prepared from the remaining free base with alcoholic hydrochloric acid. This hydrochloride crystallized from methyl ethyl ketone. The yield amounted to 45%. Melting point 168–171° C. Chlorine content 6.83% (calculated 6.82%). Ultraviolet absorption spectrum: $\lambda_{max}$=270 m$\mu$, $\epsilon_{max}$=15,900.

*Analysis.*—Found: C, 62.12%; H, 7.33%; N, 5.43%; OCH$_3$, 23.01%. Calculated: C, 62.30%; H, 7.17%; N, 5.39%; OCH$_3$, 23.85%.

While we have described our invention in connection with specific embodiments and applications, other modifications thereof will be readily apparent to those skilled in this art without departing from the spirit and scope of the invention as defined in the appended claims.

What we claim is:

1. An indolylethylamine of the formula:

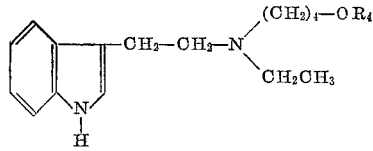

wherein R$_4$ is alkyl of 1–8 carbon atoms.

2. An indolylethylamine of the formula:

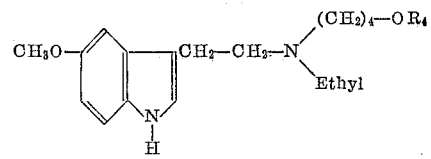

wherein R$_4$ is alkyl of 1 to 8 carbon atoms.

3. An indolylethylamine of the formula:

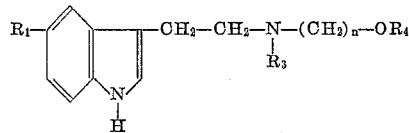

wherein R$_1$ is alkoxy of 1–6 carbon atoms, R$_3$ is alkyl of 1–6 carbon atoms, R$_4$ is alkyl of 1–8 carbon atoms and $n$ is a number from 3–6.

4. An indolylethylamine of the formula:

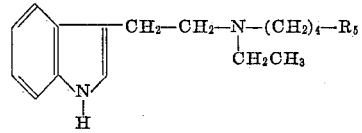

wherein R$_5$ is the acyloxy residue of saturated lower aliphatic monocarboxylic acids.

5. An indolylethylamine of the formula:

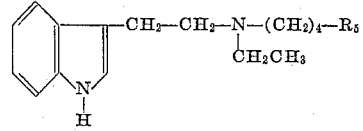

wherein R$_5$ is a member selected from the group consisting of the acyloxy residue of saturated aliphatic acids of up to 18 carbon atoms, the acyloxy residue of monoolefinically unsaturated aliphatic acids of up to 5 carbon atoms, the acyloxy residue of aromatic acids, the acyloxy residue of aromatic saturated aliphatic acids of up to 3 carbon atoms in the aliphatic chain, the acyloxy residue of cyclopentanic acid and the acyloxy residue of cyclohexaneacetic acid.

6. An indolylethylamine of the formula:

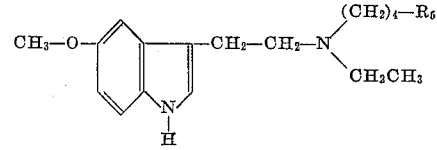

wherein R$_5$ is hydrocarbon carboxylic acyl.

7. An indolylethylamine of the formula:

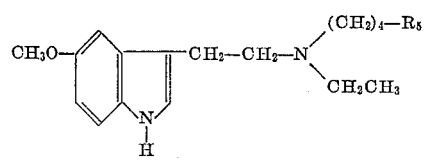

wherein R$_5$ is the acyloxy residue of saturated lower aliphatic monocarboxylic acids.

8. 3-{2' - (4'' - acetoxy - N - ethylbutylamino)ethyl} indole.

9. 3 - [2' - {4'' - (3''', 4''', 5'''-trimethoxybenzoyloxy)-N-ethylbutylamino}ethyl] indole.

10. 3 - {2' - (4'' - hydroxy - N - ethylbutylamino)ethyl} 5-methoxy indole.

11. 3 - [2' - {4''-(3''', 4''', 5'''-trimethoxybenzoyloxy)-N-ethylbutylamino}ethyl] 5-methoxy-indole.

References Cited in the file of this patent

Powell:—J. Am. Pharm. Assoc., vol. 44, pages 399–404 (1955).

UNITED STATES PATENT OFFICE
CERTIFICATE OF CORRECTION

Patent No. 3,067,206              December 4, 1962

Teunis Kralt et al.

It is hereby certified that error appears in the above numbered patent requiring correction and that the said Letters Patent should read as corrected below.

Column 1, lines 16 to 23, the formula should appear as shown below instead of as in the patent:

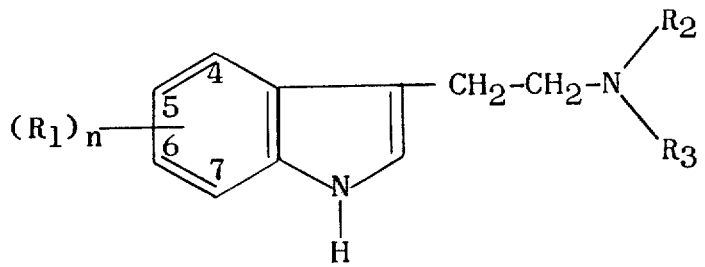

Signed and sealed this 30th day of July 1963.

(SEAL)
Attest:

ERNEST W. SWIDER

Attesting Officer

DAVID L. LADD

Commissioner of Patents